May 26, 1936.   R. E. WATTS   2,042,083
DRIVING MECHANISM FOR ENGINES, COMPRESSORS, PUMPS, AND OTHER MACHINES
Filed Nov. 12, 1934   3 Sheets-Sheet 1

INVENTOR
Richard E. Watts
BY
ATTORNEY

INVENTOR
Richard E. Watts
BY
ATTORNEY

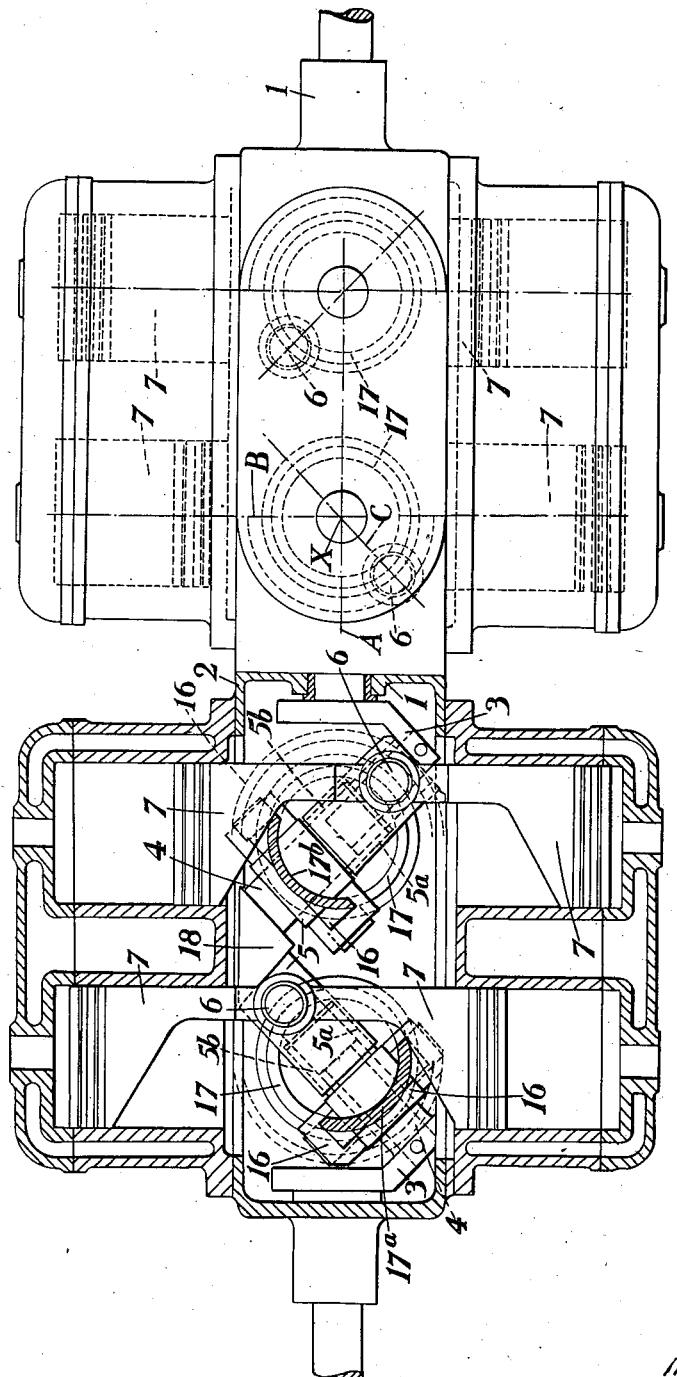

Patented May 26, 1936

2,042,083

UNITED STATES PATENT OFFICE 2,042,083

DRIVING MECHANISM FOR ENGINES, COMPRESSORS, PUMPS, AND OTHER MACHINES

Richard Edward Watts, Stamford, England

Application November 12, 1934, Serial No. 752,793
In Great Britain November 16, 1933

14 Claims. (Cl. 74—50)

This invention relates to driving mechanism for engines, compressors, pumps and other machines and in particular it is concerned with mechanisms including Z crank shafts or shafts of the kind having an inclined crank pin, the axis of which generally cuts the axis of the shaft at a point midway of the length of the pin.

In mechanism according to the present invention the inclined crank pin carries a bearing to which the piston or other reciprocating part is pivotally connected at an appropriate distance from the point of intersection of the axes of the crank shaft and the crank pin.

An important feature of novelty lies in the arrangement of an engine, compressor or pump with the cylinder axis cutting the crank shaft axis at the point where the latter intersects the axis of the inclined crank pin. Another such feature lies in the arrangement of engines, compressors or pumps with pistons directly pivoted to bearings carried on the inclined crank pins. In a simple form a Z crank has a bearing on the inclined crank pin, a sufficient amount of endwise movement being permitted. A piston is disposed with its axis at right angles to the crank shaft, intersecting the point of intersection of crank shaft and crank pin, and is pivotally connected to the bearing; the point of connection between bearing and piston is eccentrically placed on the latter, being preferably close to the end of the bearing or adjacent to the crank web. The bearing may, for example, be provided near one end with oppositely projecting trunnion pins adapted to turn in lugs carried by the piston.

It will be seen that as the crank shaft revolves the piston turns in the cylinder through an angle equal to double the crank pin angle, its greatest angular velocity occurring at the ends of its stroke.

In order that the nature of the invention may be made clear it is now proposed to describe typical forms of engines made in accordance with it, it being understood that the invention further includes the several novel features, combinations or arrangements embodied therein.

Such forms are shown upon the accompanying drawings, wherein:—

Figure 3 is a partly sectional view of the same viewed in the direction of the arrows 3, 3

It is to be understood that while the essential parts for understanding the invention are shown other parts which may be of any normal design and require no special illustration are omitted: for example no valves or valve gear are shown.

Figure 1:
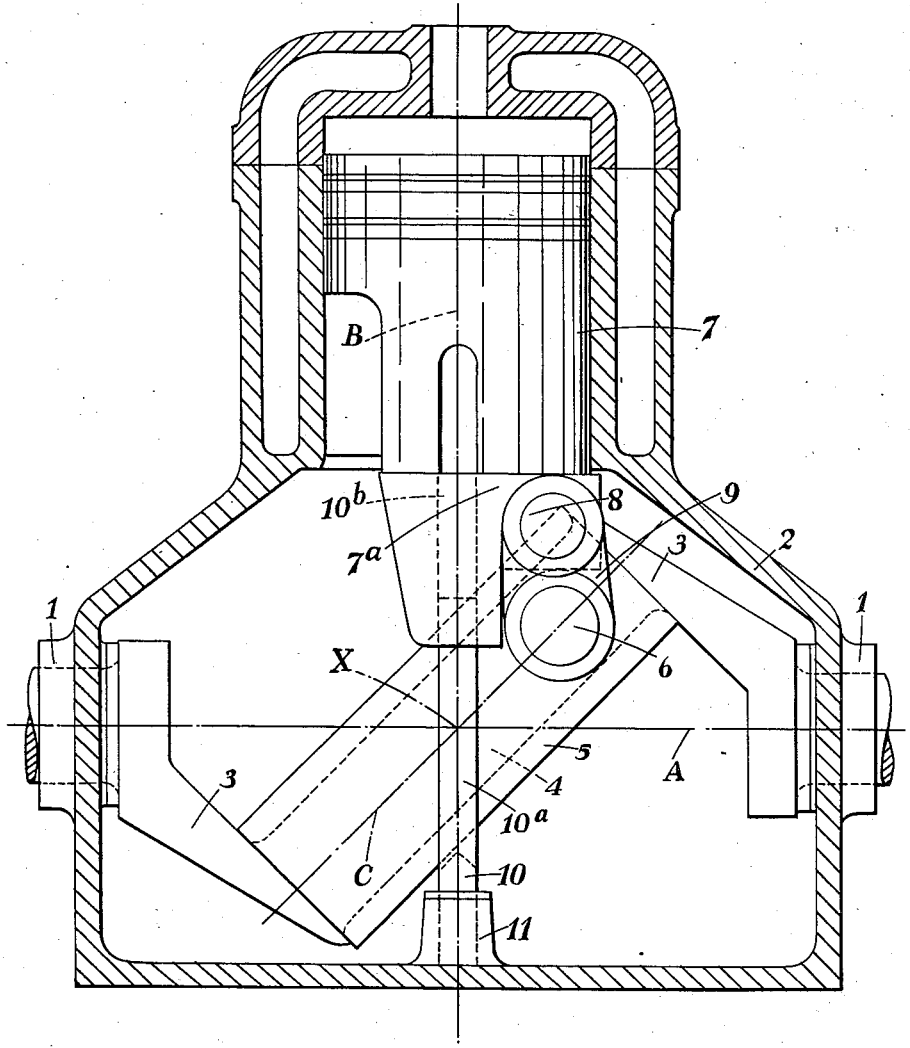
Figure 1 is a sectional view of a single cylinder engine.

Referring now to Figure 1, the Z-crank shaft is shown running in bearings provided in bosses 1, 1 on the crank case 2, and comprises crank webs 3, 3 united by an inclined crank pin 4. A bearing 5 on the crank pin 4 has a pair of coaxial trunnion pins 6 formed on or secured to it. The piston 7 has a suitably forked extension or a pair of extensions 7a straddling the bearing 5 and pivotally attached to the latter. The attachment may be made directly by means of bearings surrounding the pins 4; and in that case the bearing 5 would be capable of movement along the axis of the inclined crank pin 4 as shown in Figure 3. Figure 1, however, shows a possible alternative in which a trunnion pin 8 is formed on each extension 7a and the pivotal connection includes a pair of short links 9. In order to guide the single piston shown while maintaining the compact form of the apparatus a fork 10 is provided capable of oscillating in a footstep bearing 11 coaxial with the piston. The arms 10a of the fork engage in vertical guide passages 10b formed in the piston extensions 7a.

The operation should now be apparent: When the crank is horizontal the piston has momentarily a pure reciprocating motion, but as the crank moves towards either vertical position the piston moves angularly about its own axis with increasing velocity, the motion being momentarily purely angular at the extreme top and bottom positions. The action depends upon the fact that the axis A of the crank shaft, the axis B of the piston and the axis C of the inclined crank pin all intersect at the point X.

Figure 2:
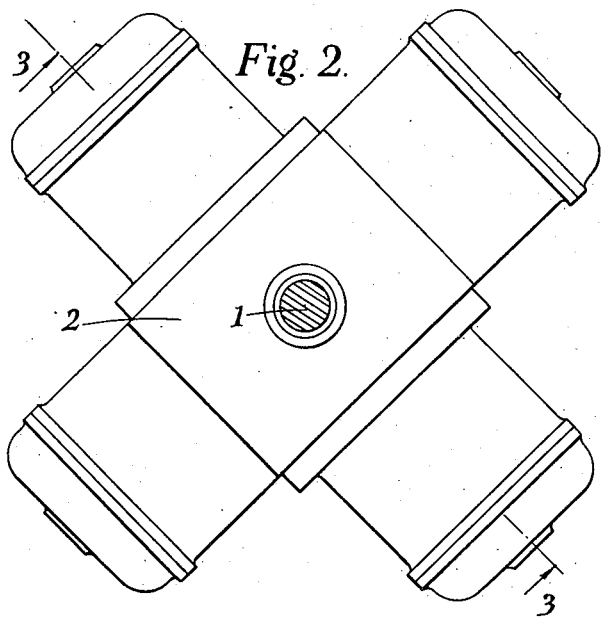
Fig. 2 is an end view of a multi-cylinder engine.

Turning now to Figures 2 and 3 a 16-cylinder engine is represented. In this case each pair of opposed pistons 7, 7 is united by a forked skirt extension straddling the bearing 5 mounted on the inclined crank pin 4. The bearing 5 is made up of two relatively rotatable parts taking the form as shown of inner and outer sleeve portions 5a and 5b, so that the trunnions 6, 16 are permitted the necessary angular movement relatively to one another as well as the bodily movement along the pin. It is to be noticed that in this case the bearing 5 is shorter than the pin 4, so that the necessary movement of the bearing along the pin can take place as the pistons move from their extreme in and out positions to intermediate positions and vice versa. The rigid connection between the opposed pistons of each pair makes additional guides unnecessary. The second pair of pistons 17, connected to the second pair of trunnions 16, 16 on the bearing 5, is at right angles to the first pair of pistons 7, 7 and the amplitude of the oscillatory angular piston movement can be seen from the positions of the piston extensions 17a, 17b; these show the mid-stroke positions of one piston of each of the approaching and receding piston pairs. It will be seen that four pistons are thus connected to the bearing on each inclined crank pin and that two inclined crank pins united by a block 18 may be arranged between adjacent main crank shaft bearings. The use of a second set of eight cylinders symmetrically arranged as indicated gives a balanced sixteen cylinder engine of extremely compact form.

Figure 4:
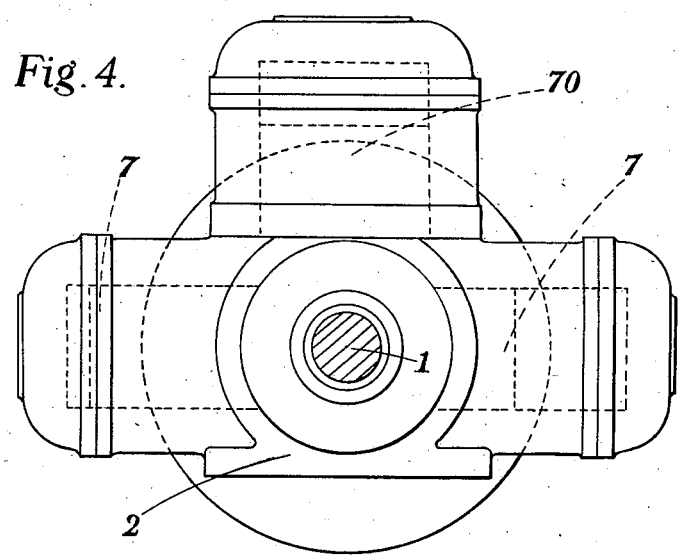
Figure 4 is an end view of an example of another form.

Figure 4 shows another arrangement in which two of the opposed pistons 7 on each crank pin of the engine of Figures 2 and 3 are replaced by a single piston 70 of double the area.

In some forms it may be necessary or desirable to allow for a little variation in the distance between the trunnions on a sleeve that may be due, for example, to a slight inaccuracy in manufacture. It will be noted that a very slight axial clearance is shown between the inner and outer sleeves 5a, 5b forming the bearing 5.

Numerous modifications are possible coming within the underlying idea of the invention; but the forms described above should suffice as examples.

I claim:—

1. A machine having in combination a crank shaft including an inclined crank pin with its axis intersecting the crank shaft axis, and a piston connected to the crank pin and having its axis intersecting the point of intersection of the crank shaft and crank pin axes, whereby the piston has a reciprocating movement and an angular movement about its axis.

2. A machine having in combination a crank shaft including an inclined crank pin, a bearing carried on the said pin, and a piston directly pivoted to the said bearing, the axis of the crank pin intersecting the axis of the crank shaft and the axis of the piston intersecting the point of intersection of the crank pin and crank shaft axes.

3. A machine having in combination a crank shaft carrying an inclined crank pin, the crank shaft axis intersecting the axis of the said crank pin, and two opposed coaxial pistons, the common axis of the said pistons intersecting the point of intersection of the crank shaft and crank pin axes, whereby the pistons are given a reciprocatory movement and an angular movement with respect to their own axes.

4. A machine having in combination a crank shaft including an inclined crank pin, a bearing carried on the said pin, and two opposed coaxial pistons rigidly connected together and directly pivoted to the said bearing, the axis of the crank pin intersecting the axis of the crank shaft and the axes of the coaxial pistons intersecting the point of intersection of the crank pin and crank shaft axes.

5. A machine having in combination a crank shaft including an inclined crank pin, a bearing carried on the said pin, and two pairs of pistons, the two pistons of each pair being coaxial and rigidly coupled together and each pair having its axis perpendicular to the axis of the other pair, each pair being directly pivoted to the said bearing, whereby the pistons have angular movement with respect to their own axes and also a reciprocating movement.

6. A machine having in combination a crank shaft including an inclined crank pin, a bearing carried on the said pin, two opposed coaxial pistons rigidly connected together and directly pivoted to the said bearing, a third piston of approximately the area of the combined areas of the opposed pistons and having its axis perpendicular to the axis of the opposed pistons, the third piston being also directly pivoted to the said bearing.

7. A machine having in combination a crank shaft including an inclined crank pin with its axis intersecting the crank shaft axis, and a plurality of pistons each having its axis intersecting the crank shaft axis at the point of intersection of the crank pin and crank shaft axis, whereby the pistons are given angular movement with respect to their own axes as well as a reciprocating movement.

8. A machine according to claim 2 wherein trunnions are employed for connecting the said piston directly to the said bearing.

9. A machine according to claim 1 wherein a piston is pivotally connected to a link and wherein said crank pin carries a bearing, said bearing being pivotally connected to said link on an axis perpendicular to the axis of said crank pin.

10. A machine according to claim 1 wherein the cylinder axis is perpendicular to the crank shaft axis.

11. A machine according to claim 9 having also guiding means permitting both axial and rotary movement to said piston, said guiding means being mounted on the opposite side of said crank shaft to said piston.

12. A machine having in combination a crank shaft including a plurality of inclined crank pins, with the axis of each crank pin intersecting the axis of the crank shaft, and a piston for each crank pin having its axis intersecting the point of intersection if the axis of the crank pin with the axis of the crank shaft, whereby a reciprocating movement and an angular movement on its own axis is imparted to each piston.

13. A machine according to claim 12 wherein there is a plurality of cylinders disposed about each inclined crank pin.

14. A machine according to claim 12 wherein the crank shaft has adjacent webs carrying two oppositely inclined connected crank pins.

RICHARD E. WATTS.